United States Patent [19]

Muranaka et al.

[11] 4,408,259

[45] Oct. 4, 1983

[54] ELECTROCHEMICAL DOUBLE-LAYER CAPACITOR

[75] Inventors: Takayoshi Muranaka; Hajime Mori, both of Kadoma, Japan

[73] Assignee: Matsushita Electric Industrial Company, Limited, Osaka, Japan

[21] Appl. No.: 118,078

[22] Filed: Feb. 4, 1980

[30] Foreign Application Priority Data

| Feb. 9, 1979 [JP] | Japan | 54-14743 |
| Feb. 9, 1979 [JP] | Japan | 54-14746 |
| Jun. 1, 1979 [JP] | Japan | 54-69324 |
| Jun. 1, 1979 [JP] | Japan | 54-69325 |

[51] Int. Cl.$^3$ .................. H01G 9/00; H01G 9/04; H01G 9/08
[52] U.S. Cl. ..................... 361/434; 361/433
[58] Field of Search ............... 361/433, 434; 429/162, 429/163; 29/570

[56] References Cited

U.S. PATENT DOCUMENTS

| 2,995,614 | 8/1961 | Krueger | 429/162 |
| 3,076,860 | 2/1963 | Dickfeldt et al. | 429/162 |
| 3,700,975 | 10/1972 | Butherus et al. | 361/433 |
| 4,266,332 | 5/1981 | Markarian et al. | 361/433 |
| 4,267,565 | 5/1981 | Puppolo et al. | 361/433 |
| 4,267,566 | 5/1981 | Moresi | 361/433 |

*Primary Examiner*—James W. Davie
*Attorney, Agent, or Firm*—Lowe, King, Price & Becker

[57] ABSTRACT

Disclosed is an electrochemical double-layer capacitor which comprises a capacitor element having a pair of polarization electrodes and a spacer interposed between the electrodes and impregnated with an electrolyte solution, and a film enclosure made of two film sheets which have been thermally bonded by heat sealing along their entire periphery. The film sheets are bonded directly or through a heat-fusible resin plate having an opening in which the capacitor element is received. When using the heat-fusible resin plate, the film sheet is made electrically conductive for allowing easy connection to electric appliances or allowing easy connection of a plurality of capacitor elements in series.

10 Claims, 34 Drawing Figures

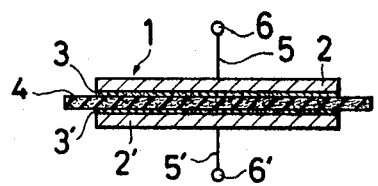
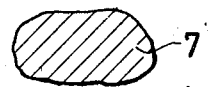
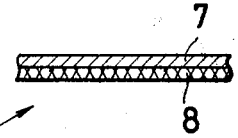
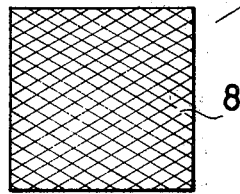
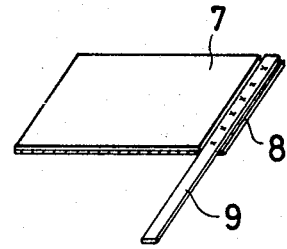
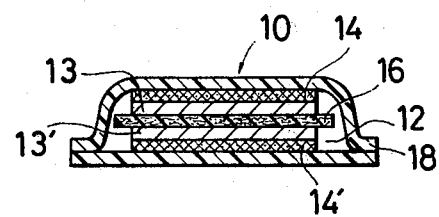
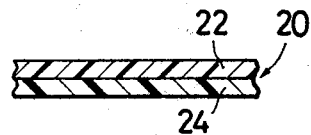

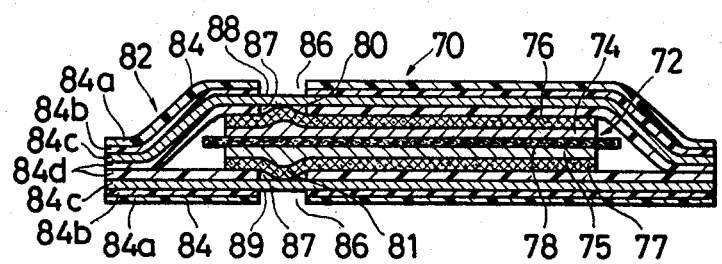
FIG. 11
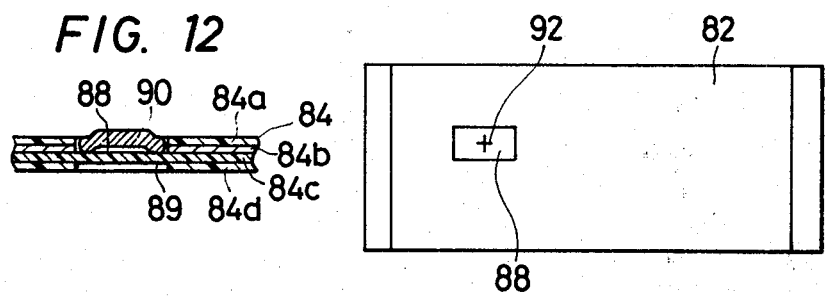
FIG. 12
FIG. 13
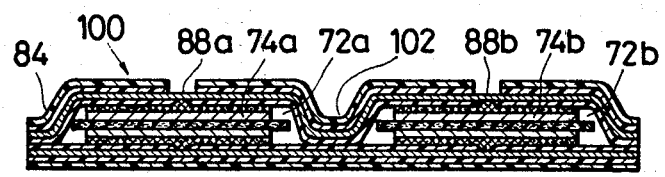
FIG. 14
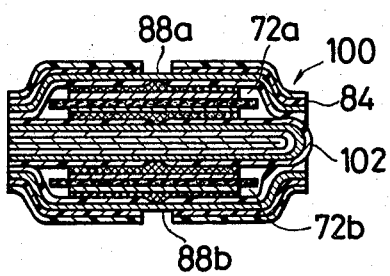
FIG. 15

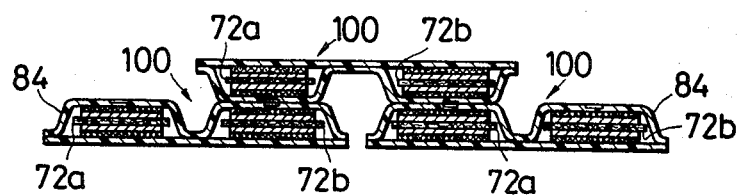
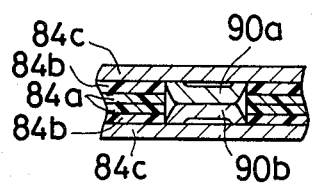
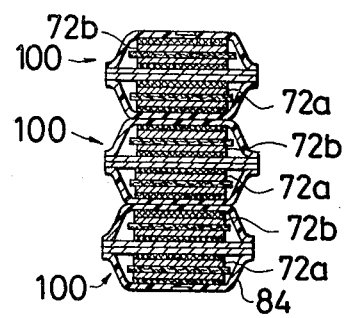
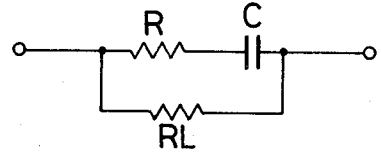
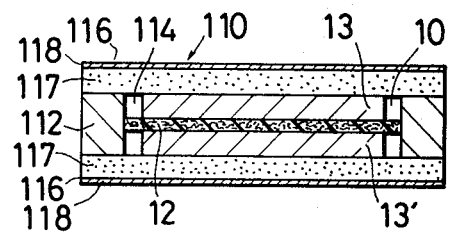
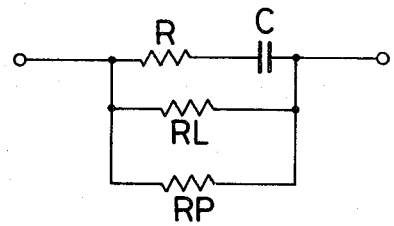

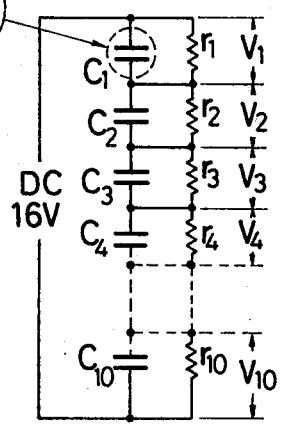
FIG. 22
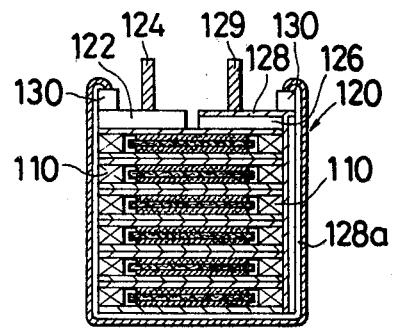
FIG. 23
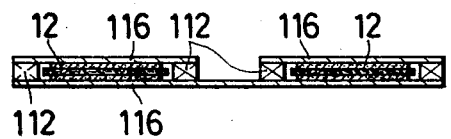
FIG. 24
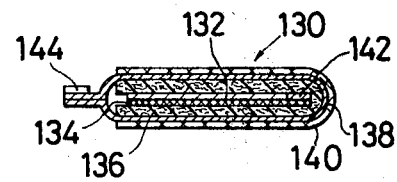
FIG. 25
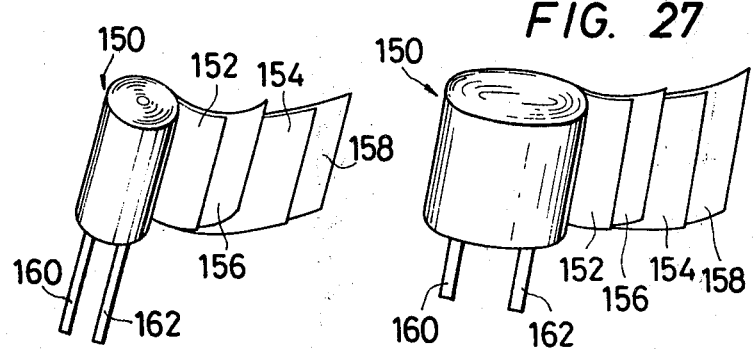
FIG. 26
FIG. 27

4,408,259

ELECTROCHEMICAL DOUBLE-LAYER CAPACITOR

BACKGROUND OF THE INVENTION

1. Field of the Invention

This invention relates to electrochemical double-layer capacitors, and more particularly to an improved enclosure or casing therefor.

2. Description of the Prior Art

Electric or electrochemical double-layer capacitors make use of an electric double layer formed at an interface between each polarization electrode and an electrolyte, and are usually comprised of a pair of polarization electrodes each made of carbon which is usually applied to a conductive metal plate and a spacer or separator impregnated with an electrolyste solution, the spacer being interposed between the pair of electrodes which are facing each other.

the electrochemical double-layer capacitor of the just-mentioned type has a much greater electrostatic capacity than ordinary electrolytic capacitors and is rapidly chargeable similarly to the electrolytic condensers or capacitors, so that it has become of major interest as a substitute for known secondary cells or batteries for its application to power units for back-up or stand-by purpose.

In the manufacture of the electrochemical double-layer capacitor, it is the common practice to use as an enclosure or casing a combination of a metal container shaped by press work and a sealing plate therefor. However, since there is a recent trend of making the thickness of the electrochemical double-layer capacitor very small from viewpoints of its characteristic properties and applications, a relatively large proportion of production cost is occupied by the container and the cost of the material for the container now presents a problem of economy.

Further, the electrochemical double-layer capacitor has an advantage that a great electrostatic capacity is obtained as compared with those obtained from other types of capacitor but has a disadvantage that the withstand voltage is as low as below several volts. Thus, its application is restricted to an extent. In other words, due to the low withstand voltage, it can not be applied to electric appliances using high voltage.

On application to such electric appliances as operated under high voltage, it is necessary to use a plurality of electrochemical double-layer capacitors connected in series. However, the known electrochemical double-layer cpacitor is not suitable for that purpose and thus there is a further demand of developement of an electrochemical double-layer capacitor of a novel enclosure construction.

SUMMARY OF THE INVENTION

It is an object of the present invention to provide an electrochemical double-layer capacitor which has an improved casing or enclosure made of a film material.

It is another object of the present invention to provide an electrochemical double-layer capacitor which is simple in construction of casing and inexpensive.

It is a further object of the invention to provide an electrochemical double-layer capacitor with an improved enclosure suitable for making the capacitor thin.

It is a still further object of the invention to provide an electrochemical double-layer capacitor in which a plurality of capacitor elements are electrically connected in series or in parallel but are separated from one another by a simple way.

It is another object of the invention to provide an electrochemical double-layer capacitor in which a plurality of capacitor elements are connected in series and each element has a resistor connected in parallel, so that the individual capacitor elements are applied with almost the same voltage thereby keeping the electrostatic capacities of the plurality of the capacitor elements nearly at the same level.

It is another object of the invention to provide an electrochemical double-layer capacitor which can withstand high voltage by connecting a plurality of capacitor elements in series or which is imparted with a desired level of electrostatic capacity by connecting a plurality of the capacitor elements in parallel by a simple way.

It is an additional object of the invention to provide an electrochemical double-layer capacitor which has wide utility in the field of the back-up or stand-by service for DC power sources.

According to one aspect of the invention, there is provided an electrochemical double-layer capacitor which comprises a capacitor element including a pair of polarization electrodes and a spacer interposed between the pair of polarization electrodes and impregnated with an electrolyte solution, and a film enclosure for enclosing the capacitor element in a hermetically sealed condition, the film enclosure being formed of two film sheets each of which has at least a heat-fusible resin film layer for heat sealing and which have been thermally sealed along the entire periphery thereof after placing said capacitor element inbetween said two film sheets.

The film sheet may be a single layer film such as a heat-fusible polyethylene film but preferably various types of composite film which will be described in detail hereinafter are used.

According to another aspect of the invention, the film sheets for enclosing the capacitor element are made conductive and are bonded together through an insulating or resistor plate having an opening at the central portion thereof for receiving the capacitor element, by which a plurality of capacitor elements can be compactly arranged to lie one on top of another while connecting them in series or in parallel through the conductive film sheets.

BRIEF DESCRIPTION OF THE DRAWINGS

In the drawings,

FIG. 1 is a schematical view showing a fundamental construction of an electrochemical double-layer capacitor;

FIGS. 2(a), (b), (c) and (d) are views showing the fabrication process of a polarization electrode for the capacitor;

FIG. 3 is a schematical view of an electrochemical double-layer capacitor according to the invention;

FIGS. 4–7 are views showing films for enclosing an electrochemical capacitor element according to the invention;

FIG. 11 is a schematical sectional view of another embodiment of the capacitor according to the invention;

FIG. 12 is a sectional view of an external connection of the capacitor of FIG. 11;

FIG. 13 is a schematical plan view of the external connection of the capacitor of FIG. 11 which has an explosion proof cut;

FIG. 14 is a sectional view of a further embodiment of electrochemical double-layer capacitor in pair according to the invention;

FIG. 15 is a sectional view of the capacitor pair of FIG. 14 folded at the heat-sealed portion to put one on top of the other;

FIG. 16 is a sectional view of a plurality of the capacitors electrically connected in series;

FIG. 17 is a schematical enlarged view of an electrical connection between the capacitor pairs;

FIG. 18 is a sectional view of the capacitor pairs of FIG. 16 stacked in a compact way;

FIG. 19 is a diagram of an equivalent circuit of an ordinary electrochemical double-layer capacitor;

FIG. 20 is a sectional view showing a still further embodiment of an electrochemical double-layer capacitor according to the invention;

FIG. 21 is a diagram of the equivalent circuit of the capacitor of FIG. 20;

FIG. 22 is a circuit diagram of the case where a plurality of the capacitors of FIG. 20 are connected in series;

FIG. 23 is a schematical sectional view showing an example of the capacitors of FIG. 20 put one on the top of another and accommodated in a casing;

FIG. 24 is a schematical sectional view showing a capacitor pair placed on the same base film;

FIGS. 25-28 are schematical views showing further embodiments of capacitor elements according to the invention;

DESCRIPTION OF EMBODIMENTS

Figure 5:
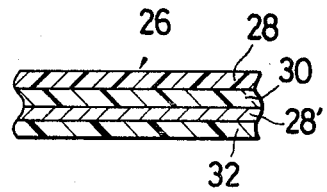

Referring now to FIG. 1, there is shown a basic arrangement of an electrochemical double-layer capacitor element 1 which includes a pair of polarization electrodes 2,2' supported respectively, on conductive metal plates 3,3' and a spacer or separator 3 intervening between the pair of the electrodes and impregnated with an electrolyte solution. The conductive metal plates 3,3' are respectively attached with lead wires 5,5' with external terminals 6,6'. The electrode is usually made of a major proportion of a carbon material such as graphite, carbon black, active carbon or the like and a minor proportion of a binder.

The electrochemical double-layer capacitor of the types mentioned above is as small in thickness of the dielectric layer as several Å and the area in face-to-face relation between the dielectric layer and the electrode is as great as 700-1400 m$^2$/g, while in the case of an aluminium electrolytic capacitor or condenser using an aluminium oxide film as a dielectric layer, the thickness of the dielectric layer is about 14 Å/V and the area is only several square meters/g. As a results, a great electrostatic capacity can be obtained by the electrochemical double-layer capacitor.

The polarization electrode of the electrochemical double-layer capacitor is usually fabricated by the procedure shown in FIGS. 2(a)-(d), i.e. a rubber-like material 7 for the polarization electrode is uniformly applied to and kept on a conductive metal plate 8 such as of an aluminum expand metal by a rolling technique, and the applied plate is cut in a given size. Then, a lead wire or band such as of aluminium is attached to the metal plate 7 to obtain the electrode.

FIG. 3 shows one embodiment of an electrochemical double-layer capacitor according to the present invention. The capacitor, generally indicated by 10, includes a capacitor element 12 which has a pair of polarization electrodes 13, 13', each supported by a conductive metal plate 14 or 14' and a spacer 16 interposed between the paired electrodes 13, 13' and impregnated with an electrolyte solution. The capacitor element 12 is enclosed or accommodated in a film enclosure or casing 18. As is well known, the polarization electrode is ordinarily formed of graphite, carbon black of active carbon and a binder in minor proportion may be supported by a conductive metal plate as shown or may not be supported. The spacer 16 is made of finely perforated film or non-woven fabric of polyethylene or polypropylene. The electrolyte may be any of known ones including, for example, an electrolyte comprised of 5-30 wt% of propylene carbonate, 70-90 wt% of γ-butyrolactone and 5-20 wt% of tetraethylammonium perchlorate. The electrolyte is usually dissolved in a non-aqueous solvent such as as alcohols.

The film enclosure or casing is made of two film sheets of a heat-fusible synthetic resin, typical of which is polyethylene or polypropylene. The film sheet has generally a thickness of 100-200μ in order to impart satisfactory mechanical or other desirable properties to the enclosure. In order to enclose the element, it is placed between the two sheets of resin film and the sheets are bonded together along the entire periphery thereof by heat-sealing or other suitable techniques.

As mentioned above, the films suitable for enclosing the element are those obtained from heat-fusible synthetic resins, for instance polyethylene resin. However, especially when a polyethylene film alone is used as the enclosure film, there may arise a problem that the thermal stress is produced in the neighborhood of the heat-sealed portion and thus fine pinholes or cracks are apt to be produced though such problem is avoidable when the heat-sealing procedure is conducted under severaly controlled conditions. The occurrence of such pinholes or cracks undesirably leads to the leakage of the internal electrolyte solution to outside through the pinholes or cracks or, even though the electrolyte solution does not escape from the inside in a liquid state, such occurrence may cause a facilitated dissipation of the electrolyte solution to outside by evaporating during storage or use at high temperature through the defects as well as through the film itself. As a consequence, the electrolyte solution gradually reduces and the performance of the capacitor is lowered.

In order to solve the problem as may occur, enclosure films have been studied and it has been found that composite films obtained by lamination of at least two kinds of film are preferably usable as the film for the enclosure. Preferable composite films are those in which at least one of the films is excellent in heat stability and solvent resistance and does not suffer from pinholes or cracking when subjected to heat-sealing operation.

Examples of such composite film are schematically sectionally shown in FIGS. 4 to 7. In FIG. 4, there is shown a composite film 20 including a polyethylene film 22 and a polypropylene film 24 which is excellent in heat stability and solvent resistance, these films being combined or bonded together by lamination. When applied as an enclosure, two sheets of the composite film are placed so that the polyethylene films of the respective sheets are facing each other and thus the polypropylene films which are excellent in heat stability and solvent resistance turn outside. When the two sheets are heat sealed, formation of pinholes or cracks in the vicinity of the heat-sealed portion along the periphery of the sheets are prevented due to the heat stability of the polypropylene film laminated.

Aside from the polypropylene film used for lamination with polyethylene film, other resin films which are excellent in heat stability and solvent resistance and are thus free of formation of pinholes or cracks on application of heat include a polyethyleneterephthalate film, polyimide film and various metal films.

It will be noted that the polyethyleneterephthalate film or polyimide film is excellent in heat stability and mechanical strength but is disadvantageous in relatively poor solvent resistance. Among metal films, an aluminium or tin film has a number of advantages that it is flexible and shows good workability, that aluminium or tin can be readily converted into from a relatively thick foil to a thin film and the film or foil shows little or no gas permeability as is experienced in synthetic resin films, thus being excellent as a barrier for inhibitting the leakage or evaporation of the electrolyte solution. Accordingly, the film of alumnium or tin which has been laminated with a resin film on the both surfaces thereof for electric insulation and for heat-sealing purpose is also preferably used in the practice of the invention. Additionally, zinc is likewise usable. The resin film suitable for lamination with the metal film may be any of resin films which are heat-sealable, inexpensive and easy for lamination, e.g. a polyethylene film is used. This is because even if the resin film is readily formed with pinholes or cracks therein on heat-sealing, the metal film can prevent communication of from inside to outside.

Different types of composite film suitable as the enclosure film are shown in FIGS. 5—9 in which three or more types of film are used and laminated.

In FIG. 5, there is shown a composite or laminated film 26 which includes a polyethylene film 28, an aluminium film 30, a polyethylene film 28' and a polypropylene film 32. In practical application, the film 26 is applied for enclosing the capacitor element so that the outer layer is the polypropylene film 32. In the event that fine pinholes or cracks are formed in the polyethylene films 28, 28' due to the thermal stress caused by heat sealing, the leakage or evaporation of the electrolyte solution can be inhibited by means of the polypropylene film 32 and the aluminium film 30. In addition, when an indication of a desired trade mark or rating mark has been made on one surface of the aluminium film 30 in advance, it is protected with the resin film and thus is free of being stained. The resin films are very thin and transparent and thus the enclosure shows a good appearance.

Figure 6:
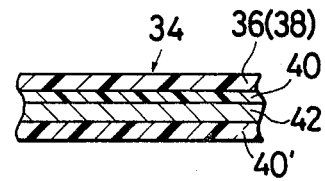
Figure 7:
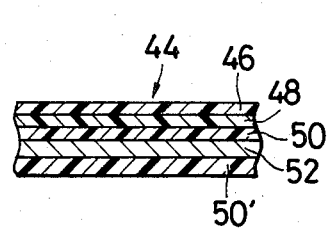

FIGS. 6 and 7 show further examples of composite films, generally indicated by 34 and 44, respectively, consisting of four and five film layers in which polyethyleneterephthalate or polyimide films are used. Though relatively poor in solvent resistance, the polyethyleneterephthalate or polyimide film is more excellent in heat stability and mechanical strength and higher in strength of adhesion to the metal film than the polyethylene or polypropylene film.

The composite film 34 is composed of a polyethylene film 36 or polypropylene film 38, a polyethyleneterephthalate or polyimide film 40, and aluminium film 42, and a polyethyleneterephthalate or polyimide film 40' arranged in this order. Similarly, as shown in FIG. 7, the composite film 44 is composed of a polyethylene film 46, a polypropylene film 48, a polyethyleneterephthalate or polyimide film 50, an aluminium film 52 and a polyethyleneterephthalate or polyimide film 50' arranged in this order.

When applied for enclosure, these composite films 34 and 44 are used so that the surface of the polyethylene or polypropylene film having good solvent resistance is in face-to-face relation with the capacitor element. As mentioned, the polyethylene terephthalate or polyimide film shows high strength of adhesion to the metal film and is excellent in heat stability and resistance to mechanical stress, so that the composite film using these films is much more excellent in heat stability and mechanical strength than that using a combination of the polyethylene film, polypropylene film and the metal film such as shown in FIG. 5.

In the above examples, the aluminium film is used, as the metal film, stainless steel, zinc or tin film is likewise usable.

As illustrated above, the composite film suitable for the purpose of the invention should include at least one film which is excellent in heat stability including, for example, a polypropylene film, a metal film such as of Al, Zn or Sn, a polyethyleneterephthalate or polyimide film. By using such heat-stable film, when the composite film sheets are thermally fused along the periphery thereof to hermetically seal the capacitor element, undesirable formation of pinholes or cracks in the film sheets due to the thermal stress occuring in the vicinity of the heat-sealed portion can be prevented. Most preferably, a composite film using a metal film which is laminated with at least one resin film on each surface thereof is used.

When the heat sealing is conducted on the polyethylene film which is readily fusible by application of heat, a heating resistor of a simple construction such as a nichrome wire or band is used. On the other hand, the heat-sealing of a rather heat-resistant film such as a polypropylene film is suitably conducted by a method of self-heating of the film itself such as a high frequency heating technique as is well known in the art. In order to sealingly, enclose the capacitor element while reducing the air remaining in the enclosure to a degree as small as possible, it is effective to conduct the heat sealing operation in vacuo.

Figure 8:
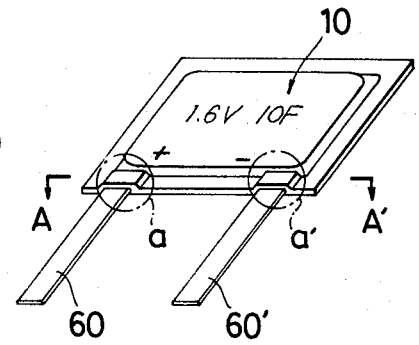
FIG. 8 is a schematical perspective view of a finished electrochemical double-layer capacitor attached with lead bands.
Figure 9:
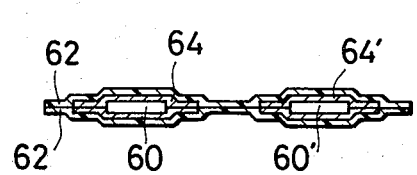
FIG. 9 is a schematical sectional view of the capacitor of FIG. 8 along the lines A—A'.
Figure 10:
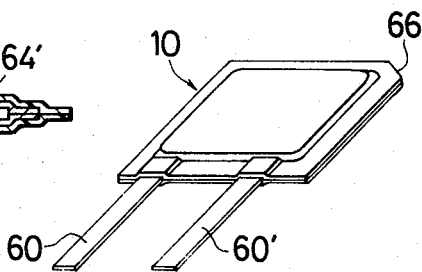
FIG. 10 is a schematical perspective view showing an example of an explosion-proof construction of the electrochemical double-layer capacitor according to the invention.

When two sheets of the enclosure film are thermally sealed to accommodate the capacitor therein, there may arise a problem that electrical leads 60, 60' from the respective electrodes of the capacitor element as shown in FIG. 8 impede the sealing of the film sheets due to differences in heat capacity and heat conductivity between the resin film and the electrical metal lead. To solve the problem, a hot melt resin such as a modified polyolefin resin typical of which is an ionomer resin is applied as a layer to the inner surfaces of the respective film sheets along the entire periphery thereof or partially at the portions a, a' of FIG. 8, by which the electrical leads 60, 60' are bonded to the film sheets through the hot melt resin layers so as to be embedded in the resin layers. This is schematically shown in FIG. 9, in which an electrical lead 60 or 60' is bonded to the composite film 62 through a hot melt resin layer 64 or 64'. When the enclosure of the capacitor 10 of FIG. 10 is partially cut away as 66 at the heat-sealed portion as shown in FIG. 10, this serves for an explosion proof.

Several types of the films as described above have been provided and experimentally confirmed as to whether they are suitable as an enclosure for the capacitor element in comparison with a prior-art capacitor. The results are shown in Table 1.

It will be noted that the samples used for the experiment are as follows: (1) A prior-art capacitor having a casing composed of a cylindrical aluminium case and a rubber packing; (2) Electrochemical double-layer capacitor A of the invention having an enclosure made of a laminated composite film of a polyethylene film and a polypropylene film; (3) Capacitor B of the invention having an enclosure made of a laminated composite film of four layers of a polyethylene film, aluminium film, polyethylene film and polypropylene film; (4) Capacitor C of the invention having an enclosure made of a laminated composite film of four layers of a polyethyleneterephthalate film, aluminium film, polyethyleneterephthalate film and polyethylene film; (5) Capacitor D having an enclosure made of a laminated composite film of four layers of a polyethyleneterephthalate film, aluminium film, polyethyleneterephthalate film and polypropylene film; (6) Capacitor E of the invention having an enclosure made of a laminated composite film of four layers of a polyimide film, aluminium film, polyimide film and polyethylene film; and (7) Capacitor F of the invention having an enclosure made of a laminated composite film of four layers of a polyimide film, aluminium film, polyimide film and polypropylene film. The prior-art capacitor has a rated voltage of 1.6 V and a rated electrostatic capacity of 1.5 F, and a size of the casing of 8 mm$\phi$×20 mm. As for the capacitors according to the invention, a rolled capacitor element is converted into a flat element in which the electrode material used is a conventionally employed one and the size of the capacitor was 3 cm in width, 4 cm in length and 1 mm in thickness. The thickness of all the composite films is set at 100$\mu$.

In the experiment, the rated voltage is applied to each of the sample capacitors at 70° C. to determine its characteristic change after 500 hours of the application.

TABLE 1

| | Variation rate of electrostatic capacity of capacitor applied with 1.6V at 70° C. for 500 hours |
|---|---|
| Prior-art capacitor | −6.9% |
| Capacitors of Invention | |
| A | −25.1% |
| B | −8.3% |
| C | −7.8% |
| D | −7.5% |
| E | −7.7% |
| F | −7.6% |

As is clear from the results of Table 1, the electrochemical double-layer capacitors using the film enclosures according to the invention are not so much different in characteristic from the prior-art capacitor and are readily applicable to various electronic apparatuses which have a tendency of being made smaller in thickness.

In the practice of the invention the polyethylene film alone or composite films for enclosing the capacitor element has, a thickness ranging from 50 to 200$\mu$, preferably 70 to 100$\mu$, to impart sufficient mechanical strengths to the enclosure or casing. Where a metal film is used, its thickness is preferably in the range of 15–50$\mu$.

In the capacitors according to the invention, the leads are arranged as extending directly from the respective electrodes as usual. In order to show the effectiveness of the thin construction of the capacitor according to the invention, the lead or terminal may be arranged in different ways.

FIG. 11 shows another embodiment of an electrochemical double-layer capacitor 70 which comprises a capacitor element 72 including a pair of polarization electrodes 74, 75 backed with metal conductive plates 76, 77, respectively and a spacer 78 sandwitched between the electrodes 74, 75 and impregnated with an electrolyte solution as in FIG. 1 except that the metal conductive plates have each an outwardly bent portion 80 or 81. The capacitor element 72 is encased in a film enclosure 82 made of two composite film sheets 84. In this case, the composite film sheet 84 is formed of a laminate of four films 84a, 84b, 84c and 84d, for instance, a polypropylene film, polyethylene film, aluminium film and polyethylene film, respectively, and should have a metal film such as an aluminium or stainless steel film which has been laminated with the resin film or films on the both surfaces thereof. The composite film 84 has recesses 86, 87 in its opposite sides to expose the metal film 84c. An inner exposed surface 89 of the metal film 84c is contacted with the bent portion 80 of the capacitor element 72 for allowing electrical connection between the metal film 84c and the capacitor element 72. An outer exposed surface 88' of the metal film 84c serves as an external terminal. In other words, the metal film itself is used as a terminal for external connection. The size and shape of the recesses may optionally be changed depending on the purpose of the capacitor in end use.

Since the outer exposed surface 88 is in the form of a recess as shown in FIG. 11, a difficulty may be in some cases encountered in connection with an external appliance. In the case, a metal connection 90 such as of aluminium, stainless steel, copper or brass is fitted in the recess 86 in connection with the exposed surface 88 of the metal film 84c so that the metal connection 90 projects above the surface of the resin film 84a. This allows easy connection with an external electrical appliance.

In case where the resin films 84a, 84b and 84d of the composite film 84 are partially removed to form the recesses 86, 86' as shown in FIG. 11, the enclosed capacitor element 72 is isolated from outside by means of the aluminium film alone at the film-removed portions. Accordingly, the exposed portion becomes smaller in mechanical strength than the other portion. If the exposed portion 88 of the metal film 84c is made with a cut on its surface to permit easier breakage of the metal film, it can perform a function in explosion proof. In addition, when the cut is made to indicate either a mark showing a polarity 92 as shown in FIG. 13 or a rating mark, the exposed portion 88 of the metal film 84c has functions as the external connection and the indication of a desired mark and also in explosion proof.

The capacitor of the above-described type has a number of advantages that the position of the external connection terminal can be arbitrarily changed as required by removing desired portions of the resin films laminated on both surfaces of the aluminium film, that since no specific part or only a part of a simple construction is used as an external terminal, the capacitor becomes inexpensive, and that the capacitor hardly suffers corrosion during storage or use since only a part of the metal film is exposed.

In general, the electrochemical double-layer capacitor has several advantages that its electrostatic capacity is large but has a disadvantage that the withstand voltage is as low as about 1.6 V. In some cases, it is required to connect a plurality of the capacitors in series so as to increase the withstand voltage to a desired degree. In some cases, it is also required to produce a great electrostatic capacity as will not be obtained by only one capacitor unit.

The above requirements can be readily satisfied according to the invention by a simple way. This will be particularly illustrated with reference to FIGS. 14 to 17.

FIG. 14 shows a capacitor pair 100 including two capacitor units each having a similar construction as illustrated with reference to FIG. 11 and similar parts are indicated by similar numerals. The two units are separated from each other at the sealed portion 102. The capacitor pair can be readily made by placing two capacitor elements 72a, 72b on a sheet of the composite film 84 at a distance, then providing another sheet of the composite film 84 to cover the capacitor elements 72a, 72b, and bonding the two sheets by the heat-sealing technique so that the capacitor elements are separately enclosed as shown. The capacitor elements 72a, 72b are electrically connected each other through the metal conductive plates 74a, 74b and the aluminium film 84c. In FIG. 14, the capacitor elements 72a, 72b are connected in parallel, showing the electrostatic capacity two times as much.

As shown in FIG. 15, when the capacitor pair 100 is folded at the heat-sealed portion 102 at which the two capacitor elements 72a, 72b are separated and the outer sheet of the composite film is cut off as shown, the capacitor elements 72a, 72b are connected in series and thus the capacitor pair 100 shows a withstand voltage two times that of one capacitor unit. In FIGS. 14 and 15, 88a' and 88b indicate external connection terminals, respectively.

Similarly, a plurality of the capacitor elements can be electrically connected in a compact way using the capacitor pairs by putting one on top of another while electrically connecting them in series. Alternatively, the capacitor pairs 100 can be successively electricallt connected through the metal films 84c and the metal connections 90a, 90b in a manner as shown in FIGS. 16 and 17. When each pair is folded at the sealed portion to lie one on the top of another, the plurality of capacitor elements are vertically piled as shown in FIG. 18, and connected in series when the upper sheet of the sealed portion is cut off at the folded portion of each pair. The thus assembled capacitor has a withstand voltage of 6 times as much as that of the capacitor unit. When it is desired to connect the plurality of capacitor elements in parallel, it is sufficient not to cut off the aluminium film 84c of the outer sheet of the composite film 84 at the sealed portion when the capacitor pair is folded.

In the practice of the invention, the composite film for enclosing the capacitor element is usually in a thickness of 50-200μ as defined hereinbefore and the capacitor element has generally a thickness of about 800μ, and a total thickness of one capacitor unit is about 1 mm. One capacitor element is generally rated to have to withstand voltage of 1.6 V and an electrostatic capacity of 1.5 F, and is designed to have a size of 3 cm in width and 4 cm in length. When a plurality of such capacitor elements are arranged to be electrically connected as shown in FIG. 18, there can be obtained a very thin electrochemical double-layer capacitor having a withstand voltage of 9.6 V, an electrostatic capacity of 0.25 F and a size of 3 cm in width and 4 cm in thickness.

As will be appreciated from the above, the assembled electrochemical double-layer capacitor according to the invention in which a plurality of capacitor elements are separately enclosed and electrically connected in series or in parallel can be fabricated by a simple manner to have desired levels of withstand voltage and electrostatic capacity. In this embodiment, the metal film of the composite film sheet which is laminated with the resin film or films on each surface thereof is partially exposed for use as a connection terminal.

When a plurality of the capacitor elements are connected in series as described, there may arise a problem that due to the scatter of characteristics, particularly leakage current, of the individual elements, the applied voltage is not satisfactorily divided into 1/n where n is the number of capacitors connected in series and thus the voltage applied to the individual capacitors disperses.

That is, the electrochemical double-layer capacitor consists of an equivalent series resistance R and an electrostatic capacity C, and an insulating resistance $R_L$ representing the leakage current as shown in FIG. 19. When the electrostatic capacities $C_1, C_2 \ldots C_n$ of a plurality of the capacitors connected in series are $C_1 \approx C_2 \ldots \approx C_n$, the entire applied voltage is divided based on differences in the insulating resistance $R_L$. Accordingly, in order to apply almost the same voltage to the individual capacitors connected in series, it is necessary to add an external resistor to the individual capacitors in parallel.

A still further embodiment of the electrochemical double-layer capacitor according to the invention is shown in FIG. 20, generally indicated by 110. The capacitor 110 includes the capacitor element 12 having the pair of polarization electrodes 13, 13' intervening the spacer 14 impregnated with an electrolyte solution, a resistor plate 112 having an opening 114 for receiving the capacitor element 12 therein, and conductive film sheets 116 brought in contact with the upper and lower sides of the element 12, the resistor plate 112 and the conductive film sheets being thermally fused to hermetically seal the element 12. In this case the conductive film sheet 116 is composed of a laminate of a conductive polymer film 117 and a metal film 118. The sheet 116 may be composed of the conductive polymer film 117 alone.

The electric circuit of the capacitor incorporated with the resistor is shown in FIG. 21, in which $R_p$ represents a resistance of the resistor plate 112 and is connected in parallel with the capacitor element.

The resistor plate 112 having the opening 114 may be in the form of a ring, square or other suitable shapes. The resistor plate is made of a mixture of a heat-fusible polymeric material such as polyethylene, polypropylene, butyl rubber, ethylene-propylene rubber and silicon rubber and a carbon black such as acetylene black. The conductive polymer 117 used has a similar mixture composition as mentioned above. The conductive polymer is prepared to have a volume specific resistance of $10-10^6$ $\Omega$.cm. As the conductive polymer film 116a the conductive polymer mixture of a relatively low specific resistance of about 10 $\Omega$.cm is used and the conductive polymer of a high specific resistance ranging $10^3-10^6$ $\Omega$.cm is used as the resistor plate 112.

The metal film 11 of the conductive film sheet 116 serves as a gas barrier layer which is not satisfactorily attained only by using the conductive polymer film 117. Especially when the capacitor is used at high temperature, the metal film can prevent the deterioration of the electrical characteristics of the capacitor. The metal film is formed of aluminium, zinc, tin or the like metal.

In this embodiment, the resistor plate is used in order to solve the problem encountered when a plurality of capacitor elements are connected in series, but when only one capacitor of the above-described type is used, an insulating resin plate may be used instead of the resistor plate. The insulating resin plate is made of a heat-fusible, insulating resin such as polyethylene, polypropylene, butyl rubber, ethylenepropylene rubber and silicon rubber. That is, in the practice of the invention, the two film sheets of the enclosure may be bonded directly or through a heat-fusible plate having an opening for receiving the capacitor element therein.

In Table 2, there are shown electrical characteristics of the capacitor of this embodiment of the invention in comparison with those of a prior art electrochemical double-layer capacitor. In the table, the characteristic values of one capacitor are each an average of 100 capacitors and those of 10 capacitors connected in series are each an average of 10 units as shown in FIG. 22.

In FIG. 22, there is shown a circuit diagram in case where 10 electrochemical double-layer capacitors according to the invention are connected in series and in which $C_1$, $C_2$ ... $C_{10}$ represent capacitor elements and $r_1$, $r_2$ ... $r_{10}$ represent resistor elements based on the individual resistor plates 112.

TABLE 2

| | | rated voltage (V) | electrostatic capacity (F) | internal resistance ($\Omega$) | leakage current (mA) | insulating resistance (K$\Omega$) | applied voltage (V) |
|---|---|---|---|---|---|---|---|
| One Capacitor | Prior art capacitor | 1.6 | 10.5 | 0.35 | 0.1–0.5 | 3.2–16 | — |
| | Capacitor of invention | 1.6 | 10.4 | 0.34 | 0.5–0.55 | 2.9–3.2 | — |
| 10 capacitor connected in series | Prior art capacitor | 16 | 1.05 | 3.5 | 0.3–0.4 | 40–53 | 0.46–3.1 |
| | Capacitor of Invention | 16 | 1.04 | 3.4 | 0.5–0.55 | 29–32 | 1.52–1.68 |

In order to confirm the effect of the conductive film 116, capacitor A using no metal film and capacitor B using the metal film 116b were fabricated each five in number and were subjected to lifetime test under application of rated voltage for 1000 hours at 70° C. The test results are shown in Table 3 below.

TABLE 3

| | Rate of variation of electrostatic capacity | Internal resistance ($\Omega$) | Leakage current (mA) |
|---|---|---|---|
| A | −21% | 0.35 → 0.80 | 0.35 → 0.30 |
| B | −5.8% | 0.35 → 0.51 | 0.35 → 0.25 |

FIG. 23 shows a plurality of the capacitors 110 of FIG. 20 which are piled up successively for permitting their connection in series and encased in a metal casing 120. At the top of the piled capacitors are placed a conductive plate 122 from which an external terminal 124 extends and an insulating plate 126 which is distant from the conductive plate and on which is placed a conductive metal sheet 128 with a terminal 129. The conductive sheet 128 is in an L form and has a portion 128a extending along the inner wall of the casing 120 and connected to the conductive film of the capacitor at the bottom. The free end of the casing 120 is enfolded and has an insulating member 130 at the tip thereof by which the conductive plate 122, and the conductive plate 128 is rather forced against the bottom of the casing assuring an electrical contact of the capacitors.

FIG. 24 shows two capacitors connected in parallel, in which the capacitor elements 12 are placed at a distance similarly to the case of FIG. 20 but they are mounted on a common conductive base of the film sheet 116.

In the foregoing embodiments, the capacitor element 12 as in FIG. 3 is of the type in which a pair of electrodes are in face-to-face relation but are separated with a spacer. Other types of the capacitor element as shown in FIGS. 25 to 28 are also usable.

FIG. 25 shows a capacitor element 130 which comprises a polarization electrode plate 132 with an aluminium conducting member 134 which is substantially completely covered with a spacer 136. The spacer 136 is surrounded by another electrode plate 138 with an aluminium conducting member 140. Aluminium leads 142, 144 are disposed on the respective electrodes or conducting members.

FIGS. 26 and 27 show a similar capacitor element 150, in which two polarization electrode sheets or films 152, 154 are convolutely wound through two spacers 156, 158, in the form of a cylinder or oval. Aluminium leads are indicated by numerals 160, 162, respectively.

Figure 28:
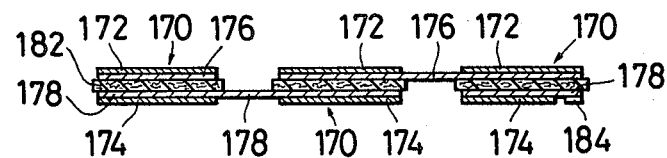

FIG. 28 shows another type of the capacitor element comprises a plurality of element units 170 each having a pair of polarization electrodes 172, 174, having aluminium conducting members 176,178, respectively. The electrodes 172, 174 are in face-to-face relation through a spacer 180. Adjacent two element units are connected through one of the conducting members 176,178 which is used in common. Another conducting member is in connection with an adjacent element unit in the opposite side. In this manner, a plurality of element units are successively connected to form a capacitor element. The element units at opposite ends are provided with metal leads 182, 184, respectively.

The electrochemical double-layer capacitor according to the invention has wide utility in the field of electrical or electronic apparatuses. Typical examples of application of such capacitor are shown in FIGS. 29 to 31 in which the capacitor is indicated by C.

Figure 29:
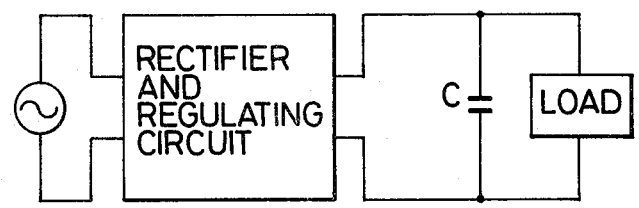
FIGS. 29-31 are circuit diagrams showing applications of electrochemical double-layer capacitor.

In FIG. 29, the capacitor C is connected in parallel to a load and used as a back-up or stand-by power source for electronic appliances, particularly useful as a back-up power source for semiconductor memory elements.

Figure 30:
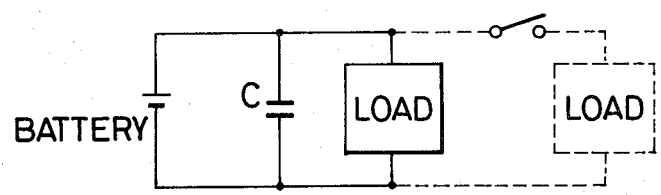

In FIG. 30, the capacitor C is connected in parallel to various types of small-size battery by which it serves as a compensator at the time of overload or at low temperature.

Figure 31:
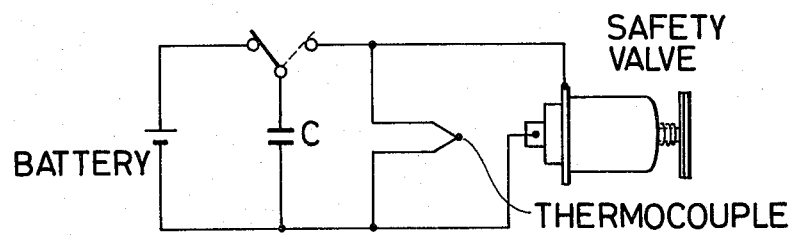

In a safety device of FIG. 31 using a thermocouple for preventing the flame of gas fittings from dying out during use, the capacitor is usable as a power source for instantaneously retaining a safety valve.

What is claimed is:

1. An electrochemical double-layer capacitor which comprises a capacitor element including a pair of polarization electrodes each made of active carbon and a binder for the active carbon, supported on a sheet-like collector; a spacer separating the pair of polarization electrodes and impregnated with an electrolyte solution; and a hermitically sealed enclosure encasing said capacitor element, the enclosure being formed by heat-sealing one or more composite films, each of said composite films being a laminate, in order, of a polyethylene film, aluminium film, polyethylene film and polypropylene film, or a laminate, in order, of a polyethyleneterephthalate film, aluminium film, polyethyleneterephthalate film, polyethylene film and polypropylene film.

2. An electrochemical double-layer capacitor according to claim 1, wherein the enclosure is formed from two composite films and the aluminium film of each composite film is electrically connected to one of said pair of polarization electrodes, whereby each aluminium film serves as a terminal for external connection.

3. An electrochemical double-layer capacitor according to claim 2, wherein part of the polyethylene or polyethyleneterphthalate film laminated on the opposite surfaces of the aluminium film is removed to expose the aluminium film, the inner exposed portion of the aluminium film is electrically connected to a corresponding polarization electrode of said capacitor element, and the outer exposed portion of the aluminium film is used as a terminal for external connection.

4. An electrochemical double-layer capacitor according to claim 3, wherein a metal terminal is provided at the outer exposed portion in electrical connection with the aluminium film so as to extend above the surface of the polyethylene or polyethyleneterephthalate film.

5. An electrochemical double-layer capacitor according to claim 3, wherein the outer exposed portion of said aluminium film is made with a cut serving the purpose of explosion proofing.

6. An electrochemical double-layer capacitor according to claim 5, wherein said cut is an indication of polarity or rating.

7. An electrochemical double-layer capacitor according to any one of claims 1, 2, or 3, wherein two capacitors are enclosed in an enclosure having a sealed portion between the two capacitor elements so that said two capacitor elements are separately sealed in the enclosure, and the two capacitor elements are electrically connected in series.

8. An electrochemical double-layer capacitor according to claim 7, wherein the enclosure is folded at the sealed portion so that the two capacitor elements lie one on the top of the other to form a capacitor unit.

9. An electrochemical double-layer capacitor according to claim 3, wherein a plurality of the capacitor units are provided and put one on top of another, and are electrically connected through a metal terminal fitted in each outer exposed portion of the aluminium film of the enclosure film.

10. An electrochemical double-layer capacitor according to claim 3, wherein the outer exposed portion of the film sheet alone is cut away at the folded portion whereby the two capacitor elements are electrically connected in series.

* * * * *